Apr. 3, 1923.

D. G. CHANDLER

VULCANIZER

Filed Sept. 2, 1920.

1,450,794

Inventor
David G. Chandler
By Brown Boettcher-Dienner
Att'ys

Patented Apr. 3, 1923.

1,450,794

UNITED STATES PATENT OFFICE.

DAVID G. CHANDLER, OF RACINE, WISCONSIN.

VULCANIZER.

Application filed September 2, 1920. Serial No. 407,617.

*To all whom it may concern:*

Be it known that I, DAVID G. CHANDLER, a citizen of the United States, residing at Racine, in the county of Racine and State of Wisconsin, have invented a certain new and useful Improvement in Vulcanizers, of which the following is a full, clear, concise, and exact description, reference being had to the accompanying drawings, forming a part of this specification.

My invention relates to a vulcanizer, and more specifically, has reference to the provision of improved means for automatically interrupting the vulcanizing operation at a predetermined time in order to avoid injurious results from over-curing and burning.

In order that the efficient and durable vulcanization of an automobile inner tube, tire casing, etc., may be secured, it is primarily essential that the rubber be subjected to the curing action of the vulcanizer for a definite predetermined time interval so that the rubber will not be over-cured nor under-cured. This time interval may vary considerably, different thicknesses of rubber, and rubber of different characteristics requiring longer or shorter time intervals. Heretofore, the general practice has been to merely guess when the vulcanization has been properly completed or to keep some time approximation with a watch. Either practice is very liable to result in the improper curing of the rubber, particularly from over-curing or burning as the result of failing to discontinue the vulcanizing operation at the proper time. This is a frequent occurrence in large garages and repair shops where other duties often call the repair man from the vulcanizing operation.

It is the fundamental object of the present invention to provide a construction of vulcanizer which will obviate all error in the curing interval, and the necessity for close attention to the vulcanizing operation. This I accomplish by the provision of mechanism for automatically interrupting the vulcanizing operation after the lapse of a predetermined time interval. The particular manner in which I attain this object will be hereinafter apparent from the following specification taken in connection with the accompanying drawing wherein I have illustrated one preferred embodiment of my improved vulcanizer.

Referring to the drawings.

Figure 1:
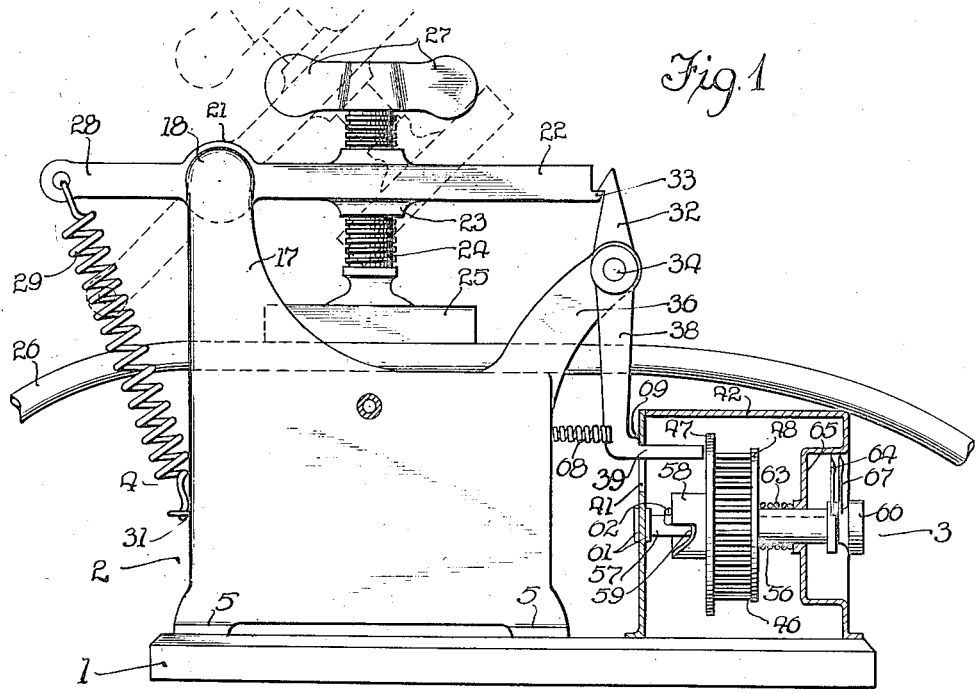
Figure 1 is an end elevational view of my improved vulcanizer.

In the exemplary form of vulcanizer chosen to illustrate my invention, 1 designates the supporting base upon which are mounted the vulcanizer proper 2 and the time controlled releasing mechanism 3. The vulcanizer 2 comprises two end standards 4—4 having feet 5 which are suitably secured to the base 1. Extending between the end standards 4—4 is a rectangular water reservoir 7, the upper flat surface of which defines the vulcanizing surface 8. This water reservoir may be formed integral with the end standards or may be formed separate therefrom and suitably bolted in place between the same. An electrical heating element 9 is suitably secured to the under side of the water reservoir 7 for imparting its heat thereto. This heating element may be of any preferred construction, comprising, for example, a plurality of high resistance heating coils imbedded in a suitable heat refractory material. The temperature effective at the vulcanizing surface 8 is automatically maintained within definite limits through the provision of a pressure-controlled circuit interrupting gage 11. This gage has connection with the interior of the water reservoir 7 by way of the pipe 12. Upon the development of a predetermined steam pressure in the water reservoir 7— which is a comparatively accurate measure of the temperature at the vulcanizing surface 8—the pressure controlled gage 11 functions to interrupt the electric circuit of the heating element 9 through the cord 13. The dial 14 and pointer 15 on the gage indicate the approximate thermal condition of the vulcanizing surface 8.

Figure 2:
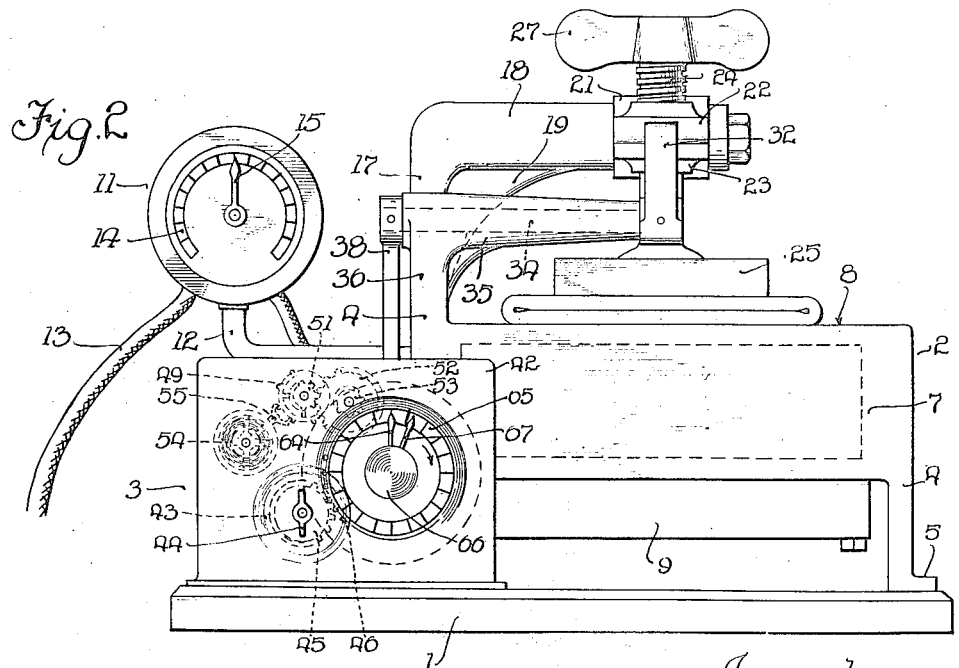
Figure 2 is a front elevational view of the same.

The left hand end standard 4 (Figure 2) is formed with an extension 17 from which projects a long horizontal hub member 18, reaching to approximately the center of the vulcanizer. This hub member is joined with the upward extension 17 by a heavy reinforcing rib 19. The outer end of the hub member 18 is formed with a reduced journal extension upon which is pivotally mounted the hub 21 of the clamp supporting lever 22. At a point approximately over the center of the vulcanizing surface 8 this lever 22 is provided with a threaded hub 23 through which screws the threaded stem 24 of a clamping plate 25. This clamping plate 25 preferably has a tiltable and pivotal connection with the end of the threaded stem 24, so that the clamping plate may more readily accommodate itself to the upper surface of the inner tube 26 or other article being vulcanized. Wing extensions 27 on the upper end of the threaded stem 24 permit any desired tension to be impressed upon the clamping plate 25. The lever 22 has a rearwardly extending arm 28 which has connection at its end with a tension spring 29 extending between the arm 28 and a lug 31 on the vulcanizer frame. This tension spring normally tends to swing the lever 22 up into the dotted line position, thereby elevating the clamping plate 25 and releasing the vulcanizing pressure contact of the tube or casing 26 on the vulcanizing surface 8. The lever 22 is adapted to be held down with the clamping plate 25 in operative position by a latch 32 having a hook nose engaging over a shoulder 33 on the end of the lever 22. The latch or pawl 32 is rigidly mounted on the end of a shaft 34 which is journaled in a horizontally extending hub 35. The hub 35 is formed integral with an extension 36 rising from the end standard 4, being joined with said extension 36 by a reinforcing web to strengthen the hub against the pressures imposed on the clamping plate 25. The shaft 34 extends entirely through the hub 35 and outside of the extension standard 36 carries a tripping arm 38. The lower end of the tripping lever 38 is formed with a horizontal finger 39 which extends through a slot 41 in the casing 42 of the time-controlled tripping mechanism 3. I shall now proceed to describe this tripping mechanism, referring only briefly to the system of clock gears therein, as this is a matter of common knowledge to those skilled in the art.

Enclosed within the casing 42 is a main spring 43 which is adapted to be wound by the winding knob 44 and which drives a gear 45. This gear meshes with a large gear 46 which is built up of a pair of discs 47 and 48 having a series of circumferential pins extending between the discs. The speed of rotation of the large gear 46 is controlled by a conventional form of escapement wheel 49 which has geared connection with the large gear 46 through a series of speed multiplying gears 51, 52 and 53. A conventional form of hairspring wheel 54 operating through an anchor escapement 55 controls the rate of motion of the escapement wheel 49.

Referring again to Figure 1, it will be noted that the large gear 46 is rigidly mounted on a sleeve 56 which is in turn rotatably mounted on a shaft 57. The large disc 47 of the gear wheel 46 is formed with an axial cam hub 58 which is cut out to form a straight cam drop 59. The shaft 57 is held against axial shifting in either direction by two collars 61 engaging over the rear end of the shaft on either side of the casing wall. A radial pin 62 in the shaft 57 is adapted to cooperate with the cam 58. A compression spring 63, which is confined between the front wall of the casing and the front of the gear wheel 46, normally tends to thrust the gear wheel 46, sleeve 56 and cam 58 to the left. The front end of the sleeve 56 carries an indicating pointer 64 which operates over a dial face 65 depressed in the front wall of the casing 42. The shaft 57 extends out from the end of the sleeve 56 and carries a knurled adjusting wheel 66 which supports a pointer 67 cooperating with the pointer 64. The shaft 57 is so mounted in the collars 61 that it requires a relatively strong turning force to revolve the shaft, and consequently it is not influenced by the rotation of the gear wheel 46 and cam 58. The finger 39 of the tripping lever is normally projected in juxtaposition to the disc 47 by a compression spring 68, a shoulder 69 on the tripping arm limiting the inward motion of the same. The relation is such that the large gear wheel 46 makes one complete revolution every fifteen or twenty minutes, or longer if desired, the indicating pointer 64 of course moving concurrently with the gear wheel 46 over the face of the dial 65. To set this time-controlled release mechanism for a definite interval of vulcanizing, the knob 66 is revolved to place the pointer 67 the desired time interval ahead of the pointer 64, as denoted by the scale divisions on the dial 65. With the continued rotation of the pointer 64 (in the direction indicated by the arrow) the cam drop 59 will, at the expiration of the given time interval, move into coincidence with the pin 62, whereupon the gear wheel 46 will be shifted axially to the left under the pressure of the spring 63, thereby overcoming the compression of the spring 68 and tripping the latch 32. The latch 32 will remain out until the resetting of the gear wheel 46 has been accomplished, as by resetting the tripping shaft 57 or by continued rotation of the gear wheel 46. It will be noted that the tripping pointer 67 may always be positioned the desired distance ahead of the continuously rotating pointer 64, irrespective of the position of the latter, and thus the present mechanism may always be set for any interval of time release without necessitating any resetting or adjusting operations.

I do not intend to be limited to the details shown and described, as my invention is capable of numerous variations and modifications.

I claim:

1. In a portable, self-contained vulcanizer for garage use and the like, the combination of a frame, a vulcanizing surface supported by said frame, means supported by said frame for heating said vulcanizing surface, a releasable clamping member carried by said frame and adapted to clamp the work against said vulcanizing surface, and a self-contained time-control mechanism supported entirely by said frame so as to be transportable therewith, said time-control mechanism being operable to automatically release said clamping member at a predetermined time.

2. A portable vulcanizing device comprising a base plate, a steam chamber mounted on the base plate, said chamber having a top surface forming a vulcanizing plate, a frame member connected with said chamber providing a pair of pivotal supports, a swinging lever having a catch mounted on one support, a presser plate for pressing the work to be vulcanized against the vulcanizing plate, a thumb screw mounted in said lever for adjusting the presser plate, and a time-controlled latch mounted on the other support for engaging the catch on said lever to hold the work to be vulcanized against the vulcanizing plate for a predetermined period of time.

3. In a portable self-contained vulcanizer of the class described, the combination of a base, a vapor generating chamber supported by said base, electrical heating means for generating a vapor in said chamber, a vulcanizing surface supported by said base and heated by vapor generated in said chamber, a releasable clamping member adapted to press the work against said vulcanizing surface, and time-control mechanism adapted to release said clamping member automatically, said time-control mechanism comprising a motivating instrumentality for actuating said time-control mechanism, said time-control mechanism and said motivating instrumentality being self-contained and supported entirely on said base so as to be transportable therewith.

4. In a portable self-contained vulcanizer of the class described, the combination of a frame, a vulcanizing surface supported by said frame, means supported by said frame for heating said vulcanizing surface, an arm pivotally supported by said frame and extending across said vulcanizing surface, a pressing surface carried by said arm, said vulcanizing surface being substantially smooth and flat for receiving inner tubes and other classes of work, means normally tending to swing said arm away from said vulcanizing surface, releasable holding mechanism for said arm comprising a pivoted latch member and a co-operating detent member, one of said members being movable with said arm and the other of said members being carried by said frame, time-control mechanism for releasing said latch member and said detent member, said time-control mechanism employing a spring as the motivating instrumentality, said time-control mechanism and said spring being self-contained and supported entirely by said frame so as to be transportable therewith.

5. A portable vulcanizing device comprising a frame, a vulcanizing surface supported by said frame, electrical heating means supported below said vulcanizing surface, a pivotal support on said frame, a movable vulcanizing member having pivotal mounting on said support, a spring having connection with said movable vulcanizing member and normally operative to separate said member from said vulcanizing surface, said movable vulcanizing member being adapted for holding an object to be vulcanized against said surface for a predetermined period of time, a latch cooperating with said movable vulcanizing member for holding the same in vulcanizing position against the tension of said spring, and a self-contained adjustable time controlled mechanism mounted in its entirety on said frame, said time controlled mechanism having direct mechanical connection with said latch and being adapted for adjustable setting for automatically releasing the latter at the expiration of a desired time interval.

6. A portable vulcanizing device comprising a base plate, a steam generating chamber mounted on said base plate, electrical heating means supported below said chamber, said chamber having a top surface forming a vulcanizing plate, a frame member connected with said chamber providing a pair of pivotal supports, a swinging lever having a catch mounted on one support, a pressure plate for pressing the work to be vulcanized against said vulcanizing plate, a thumb screw mounted in said lever and supporting the pressure plate at its lower end, a spring connected to said lever and normally operative to separate said pressure plate from said vulcanizing plate, self-contained adjustable time-controlled mechanism mounted in its entirety on said base plate and operative to automatically release said latch at the expiration of a given time interval, and a pressure gage connected to said steam generating chamber for indicating the temperature of said vulcanizing plate, said time-controlled mechanism adapted to be set in accordance with the indicated temperature afforded by said gage.

7. In combination, a vulcanizer comprising a vulcanizing surface, a clamping member for holding the work to said vulcanizing surface, means normally operative to release said clamping member, a latch for controlling said latter means, time-controlled release mechanism comprising a time advanced rotary member, means tending to shift said rotary member, adjustable cam mechanism for controlling the time of such shifting motion, and mechanical means operative to trip said latch upon the shifting motion of said rotary member.

8. In combination, a vulcanizer comprising a vulcanizing surface, a clamping plate for holding the work to said vulcanizing surface, means normally operative to remove said clamping plate from said vulcanizing surface, a latch for controlling said latter means, time controlled mechanism comprising a revolving time wheel, means tending to axially shift said time wheel, tripping means adjustable to control the time of tripping release, cam means co-operatively connecting said tripping means with said time wheel, said cam means being operative to permit shifting of said time wheel upon the expiration of the set time interval, and means for tripping said latch upon the shifting of said time wheel.

In witness whereof I hereunto subscribe my name this 28th day of August, 1920.

DAVID G. CHANDLER.